United States Patent [19]

Bocognano

[11] 4,350,565
[45] Sep. 21, 1982

[54] PROCESS FOR CONCENTRATING FLUIDS

[76] Inventor: René J. Bocognano, 3, square d'Amiens, Paris, France

[21] Appl. No.: 162,850

[22] Filed: Jun. 25, 1980

[30] Foreign Application Priority Data

Jun. 26, 1979 [FR] France ................................ 79 16469

[51] Int. Cl.³ .......................... B01D 1/30; B01D 3/10
[52] U.S. Cl. ................................. 159/47 R; 203/100; 203/DIG. 22
[58] Field of Search ............. 159/1 A, 47 R; 203/100, 203/DIG. 22; 202/233–235, 178; 210/748, 637; 366/108, 127, 600

[56] References Cited

U.S. PATENT DOCUMENTS 4,032,438   6/1977   Koblanski .......................... 210/748

Primary Examiner—Frank Sever
Attorney, Agent, or Firm—Allison C. Collard; Thomas M. Galgano

[57] ABSTRACT

A process for causing to vibrate at determined frequencies pieces having a relatively large surface, notably plane pieces, wherein a volume comprising the piece or pieces to be caused to vibrate is achieved, said piece or pieces are elastically connected to the walls of said volume wherein a fluid is running so that it supports the surface or surfaces to be caused to vibrate and vibrations are periodically generated in said fluid so as to generate shock-waves in succession which, in turn, cause the vibration at a frequency corresponding to that of the piece or pieces elastically mounted.

13 Claims, 8 Drawing Figures

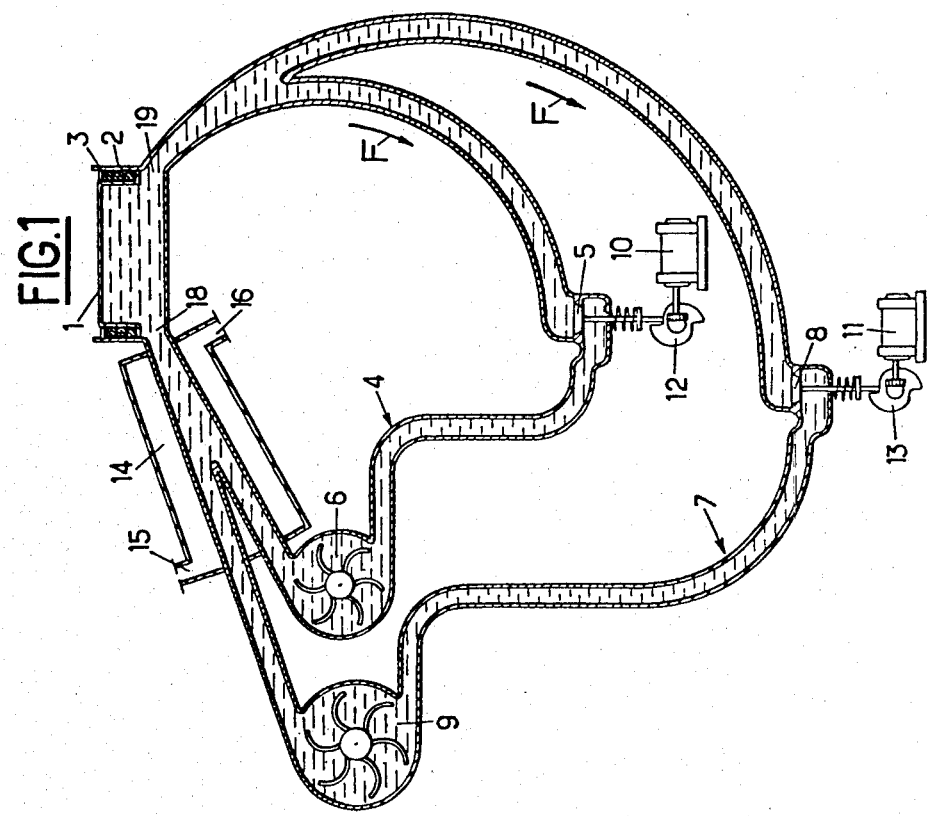
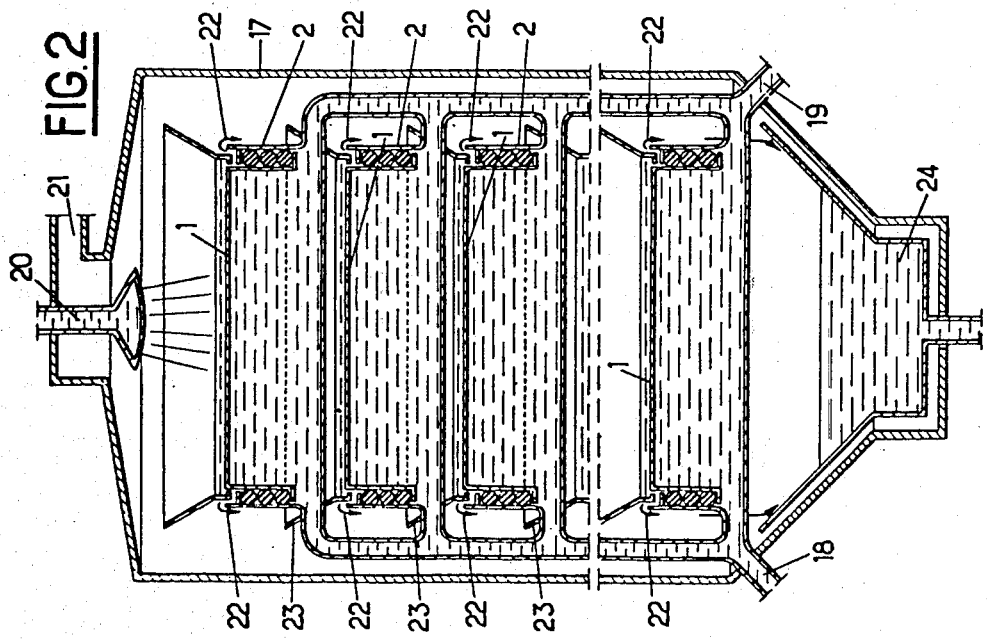

PROCESS FOR CONCENTRATING FLUIDS

The present invention relates to a process and device for causing pieces preferably plane to vibrate, as well as a distillation apparatus notably a column with table and a direct-contact condenser obtained by working out said process.

It is already known to make devices permitting to cause pieces of metal to vibrate, but said devices which generally use either an unbalancing mass turning about an axle, or electromagnetic forces, are not easy to use where large size elements are to be caused to vibrate.

The difficulties met mainly result from the fact that the mass of the vibrating pieces may become very large, which rapidly limits the maximum frequency capable to be obtained by means of an obligatorily limited power.

The present invention is aimed at providing a process making it possible to cause pieces which may have a relatively large surface to vibrate, notably, plane pieces.

Said process is characterized in that a volume comprising the piece or pieces desired to be caused to vibrate is achieved, said piece or pieces are elastically connected to the walls of said volume, a fluid is running inside said volume so as to support the piece or pieces to be caused to vibrate and vibrations are periodically generated in said fluid so as to generate shock-waves in succession which, in turn, cause the vibration at a frequency corresponding to that of the piece or pieces elastically mounted.

Also, the subject matter of the present invention is the device used for working out said process.

According to the invention, such a device consists of a circuit for the circulation of the fluid comprising a volume delimited, on the one hand by a fixed carter or housing and, on the other by the piece to be caused to vibrate which is elastically mounted on said carter or housing through joints, notably twisted joints or anchor rings, ensuring tightness, as well as of one or more elements capable to periodically generate vibrations in the fluid which circulates.

According to the invention, it is also possible to provide a circuit for the circulation of the fluid comprising several elements arranged in split and each comprising an element capable of periodically generate vibrations in the fluid circulating in the leg wherein it is located, so as to generate in the volume delimited by the carter and the piece it is sought to cause to vibrate a shock-wave equal to the resultant of the elementary shock-waves generated in each split.

Thus, thanks to the composition of the vibratory motions, it is possible to impose several determined frequencies to the vibrating pieces.

Also, the circulation of the fluid can be used for bringing heat to the vibrating pieces by reheating, for example by means of a temperature exchanger, the fluid which causes vibrations.

According to the invention, the fluid may consist either of a liquid or a gas under pressure.

Where a liquid is used, each leg must carry a centrifugal pump capable to ensure the circulation of the liquid.

In such a case, the element or elements capable to periodically generate vibrations in the liquid in circulation are in fact elements capable to stop the circulation of said liquid at regular inervals. Such elements may consist of various types among which valves periodically shut can be mentioned, notably valves operated by a mechanical means.

Where a gas under pressure is used, the element or elements capable to periodically generate vibrations is or are consisting of one or more relief-valves, notably of one or more whistles capable to generate turbulences which cause the piece to vibrate at a predetermined frequency.

According to the invention, apertures sufficiently large so as to permit the fluid to escape and thus facilitate the formation of turbulences causing vibrations, are made in the volume elastically supporting the vibrating surface.

In the above variant, several quantities of fluid under pressure can be brought onto one and the same volume supporting the vibrating surface, each quantity of fluid thus brought ending in a whistle which causes a turbulence at its own frequency. It can be seen that it is thus possible to impart motions corresponding to the sum of the elementary frequencies of the various generator devices of vibration to the vibrating surface.

Also, it is clear that according to the invention turbulences can be generated by means of various fluids such as for example steam at a suitable pressure or temperature, or compressed air.

It will be understood that the process according to the invention shows the great advantage of limiting the masses under vibration to the sole pieces which must be subjected to said vibrations, all the other parts of the device being rigidly secured to the framework.

Besides, the process decribed hereabove can be very advantageously applied to the perfection of distillation apparatus, notably to columns with tables the tables of which are caused to vibrate according to a predetermined frequency by means of a device similar to that described hereabove.

According to the invention, such an apparatus consists of a tight enclosure wherein the tables, each of them being connected to a vibration device, are arranged one above the other, as well as of apertures for leaving passage to the circulation circuits of the fluid of the vibration devices, of apertures for introducing the liquid substance to be processed and apertures for recovering the gaseous distillate and the condensate at the head and tail of the apparatus.

Obviously, the tables are preferably arranged in split on one and the same vibration device fed by one and the same liquid at a predetermined temperature, and the whole of the enclosure is connected to a vacuum-pump.

In such an apparatus, the vibrating tables will act as pulverizers or atomizers of the material to be processed which will be presented to them, that they will diffuse like a fog in the gaseous phase of the compartment.

It is known that said diffusion in fine little drops will result in multiplying the development of the total surface of the liquid-steam interface by a coefficient $K\ 10^n$. Such a phenomenon makes it possible to reduce as much the built up surface of the tables involved in the calculation of investments in said apparatus. Obviously, the effect of the vibrations will be all the more great as the phenomenon of division into fine little drops will be more rapidly obtained and that the little drops thus generated will be finer.

Under the same principle, the process according to the invention can be used for perfecting direct-contact condensers consisting at least of two apparatus similar to those described above. In such a condenser, the heads of the apparatus are connected to one another by a pipe leaving free passage to the distillate. Of course, so that such a condenser might work it is necessary that the temperature of the fluid feeding the vibration device corresponding to the apparatus located down-stream be inferior by at least some degrees to the temperature of the fluid feeding the vibration device corresponding to the apparatus located up-stream.

Such apparatus producing, on the one hand an evaporation and a condensation on the other, make it possible to obtain, for example, a recovery of distilled water from sea water and, also, a recovery of mineral salts through concentration. All the same, such apparatus make it possible to concentrate any products wherein a liquid serves as a support, fractionated distillation, fruit juice, foodstuffs, etc.

So that such condensers might work at a maximum output, it is necessary to reduce as much as possible pressure-drops inside the pipes connecting two apparatus in succession.

So as to reduce the utmost said pressure-drops, the invention also relates to a direct-contact condenser wherein there is a spheric enclosure whose central portion contains at least an assemmbly of tables similar to those described above, positioned in split on a vibration device fed with a fluid at a first temperature, and the spheric part thereof at least another assembly of similar tables arranged in split on a vibration device fed with a fluid at a second temperature lower than the first one.

It can be provided that such apparatus can be developed on a large scale in the future and, for example, be used for cooling nuclear stations, which would permit to prevent from using on a large scale the water of rivers the reheating of which is somewhat dangerous for environment.

It is indispensable that all the elements of said direct-contact condensers be connected to one and the same source of vacuum so as to balance all their functions and thus prevent any risk of explosion from occurring.

The invention will be better understood by means of the attached drawings in which:

FIG. 1 is a diagrammatical view of a device according to the invention.

FIG. 2 is a diagrammatical cross-sectional view showing an apparatus for concentrating liquids, using the process of vibration provided by the invention.

Figure 3:
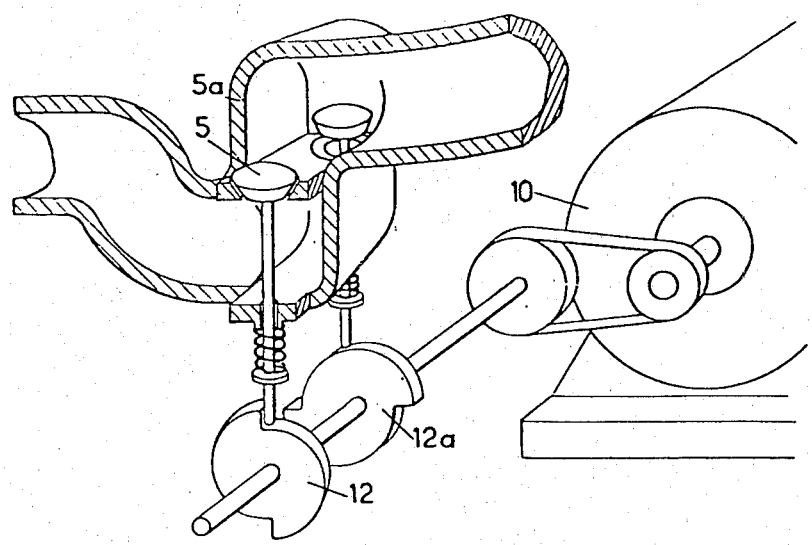
FIG. 3 is a diagrammatical perspective view of a mode of embodiment of a device generating shock-waves.

FIG. 1 illustrates a vibrating surface 1 elastically mounted on a fixed carter or housing 2 by means of twisted joints or anchor rings 3 which ensure tightness. The housing 2 is connected to a first rigid pipe 4 carrying a valve 5 and a circulating-pump 6, and to a second rigid pipe 7 also carrying a valve 8 and a circulating-pump 9.

The direction of rotation of the pumps 6 and 9 is such as the liquid travels in the direction of arrows F.

It has been diagrammatically shown how the valves 5 and 8 are driven by means of the motors 10 and 11 and of the cams 12 and 13 which ensure a slow opening motion and a rapid closing motion.

It is understood that when the valve closes suddenly a shock-wave or "water-hammering" is generated inside the corresponding pipe, which travels in the contrary direction of that of the circulation of the liquid and causes the displacement of the vibrating surface 1 when coming into contact with it.

Also, it can be understood that the surface 1 is thus subjected to a vibration the frequency of which is imposed by the shutting rhythm of the valves chiefly when the latter corresponds to the proper vibration frequency of the surface 1.

All the same, it can be understood that the effect of the two circuits 4 and 7 is to impart to the vibrating surface 1 vibrations resulting from the sum of the shock-waves generated in the circuits by the various valves.

According to the invention, a heat-exchanger 14 having inlet and outlet pipes 15 and 16 may be used for heating, the circulating-liquid, which releases a part of its heat onto the vibrating surface 1.

FIG. 2 is a diagrammatical cross-sectional view of an apparatus which permits the concentration of liquids, wherein the plates 1 are positioned above one another and housed in a tight enclosure 17. Each plate 1 is elastically mounted on the housing 2 by means of rings 3 which ensure tightness while permitting the plate to vibrate. The pipes 18 and 19 are connected to the points bearing the same numbers as those shown in FIG. 1.

It can be seen that the various tables 1 can be caused to vibrate by means of the device shown in FIG. 1 and it can be noticed that, according to the invention, it is possible to position in split several vibrating tables fed with one and the same liquid.

The substance to be concentrated is introduced into the apparatus through the pipe 20 and is pulverized above the upper table. The vacuum is created in the apparatus by drawing the steam through the pipe 21. The overflow of the liquid contained on the upper table overruns in the lower table as shown by arrows 22, the funnel 23 serving to bring back said liquid on the vibrating table located beneath.

After having flown on a certain number of tables not all shown in the drawing, the concentrated liquid gathers at 24 at the bottom of the apparatus.

FIG. 3 shows how it is possible to double the vibration frequency of the vibrating piece by doubling the number of valves which stop up the pipe wherein the liquid is flowing. To this end, it suffices to drive with one and the same motor 10 two valves 5 and 5a by means of two cams 12 and 12a off-set by 90°.

Such a device can be used when it is desired to obtain frequencies greater than those at which it is possible to cause the shutting off of a valve, for it is known that from a certain frequency the springs of valves cannot cause a correct shutting off of the same.

Figure 4:
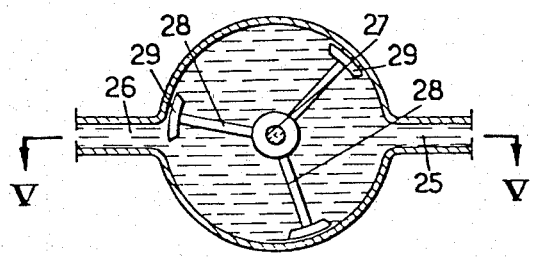
FIG. 4 is a cross-sectional view along IV—IV of FIG. 5 of a device permitting to periodically stop the outflow of the liquid.
Figure 5:
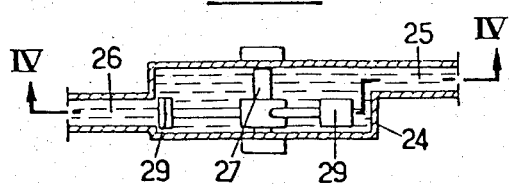
FIG. 5 is a cross-sectional view along V—V of FIG. 4.

FIGS. 4 and 5 diagrammatically show a device making it possible to periodically stop the circulation.

Said device consists of a fixed carter or housing 24 carrying an inlet-pipe 25 and an outlet-pipe 26 wherein a shaft 27 driven by a motor (not shown in the drawing) turns in any direction whatever.

Said shaft carries arms 28 whose end is provided with an obturator 29 which stops the circulation of the liquid by passing before the place of the housing 24 where the discharge pipe 26 ends.

It can be seen that at a given speed of the shaft 27 the rotation stops the circulation of the liquid at the corresponding frequency.

Figure 6:
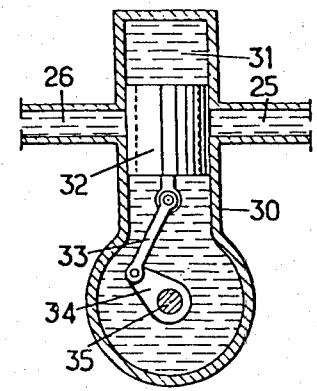
FIG. 6 is a diagrammatical cross-sectional view showing another device permitting to periodically stop the outflow of the liquid.

FIG. 6 diagrammatically shows another device also permitting periodic stopping of the circulation of the liquid.

This Figure shows the inlet-pipe 25 and the outlet-pipe 26 for the liquid which are connected to a tight housing 30, the upper part 31 of which is cylinder-shaped, in which a hollow piston 32 moves which is driven into a reciprocating movement by the rod 33 and the crank 34 mounted about a shaft 35 which is driven at a determined speed by a motor (not shown).

It can be understood that the displacement of the hollow piston 32 causes the periodical shutting of the circuit at the frequency selected.

Figure 7:
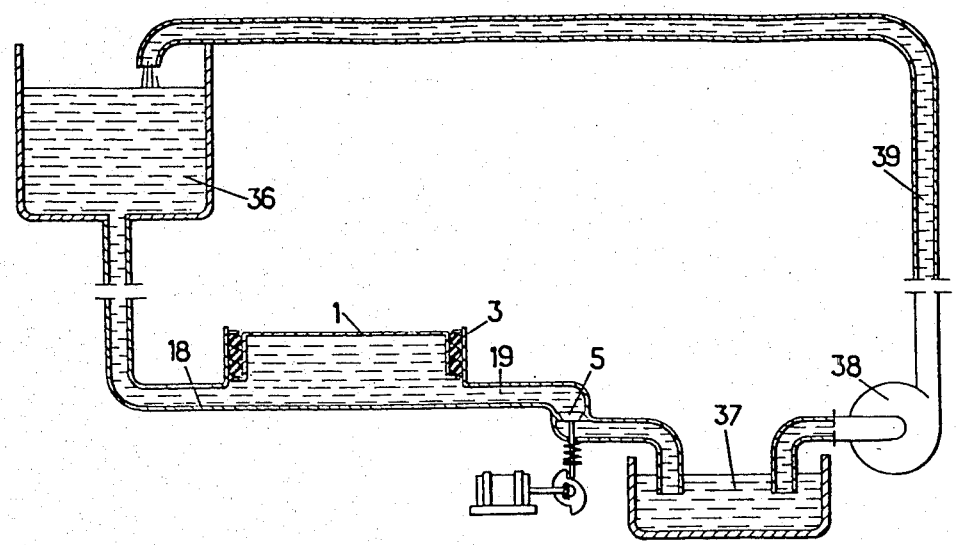
FIG. 7 is a diagrammatical view of a first variant for working out the invention.

FIG. 7 which shows a first variant for carrying out the operation of the invention, also shows the vibrating surface 1 elastically mounted by means of joints or rings 3 on the closed volume 2 whose flume 18 is connected to the tank 36 located at a sufficient height and whose discharge pipe 19 ends in a tank 37 after having crossed the valve 5 which is driven by means of a cam, as already explained.

Also, the Figure shows a pump delivering the liquid in the tank 26 by means of the pipe.

Said variant shows only one shutting means consisting of the valve 5, as well as only one vibrating piece only, but it is clear that, according to the invention, several circuits can be arranged in split so as to impose a determined vibration to the surfaces 1.

Figure 8:
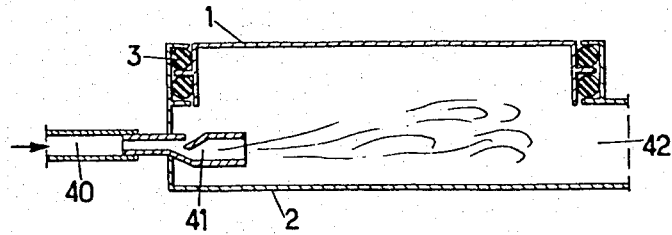
FIG. 8 is a diagrammatical view of a second variant of the working out of the invention.

FIG. 8 diagrammatically illustrates a second variant for carrying out the invention, wherein the vibrating surface 1 is elastically mounted on the housing 2 by means of the twisted joints or rings 3. A pipe 40 discharges inside said housing 2 a fluid under pressure which after having passed through a whistle 41 expands by generating a turbulence which causes the vibration of the surface 1.

The housing 2 carries an aperture 42 with a large section, so as to provide an easy discharge of the liquid which has expanded and thus facilitate the production of a turbulence.

It can be seen that the process according to the invention makes it possible to superpose several frequencies, which is not easy to obtain with the devices generally used, and that the mass of the vibrating pieces can be reduced to a large extent.

It must be understood that the mode of process described hereabove for working out the invention is not limitative and can be subjected to any suitable modifications without thereby departing from the scope of the invention.

In particular, it is clear that the shock-waves can be produced with further devices than valves and that, so as to work out the invention, it suffices to generate, at determined frequencies, sudden variations of the outflow of the circulation fluid.

Also, it is obvious that the connection between the vibrating surfaces and the fixed parts of the device can be achieved through any other means.

What I claim is:

1. A process for concentrating fluids by effecting vibration of an element at a predetermined frequency, comprising the steps of:
   providing at least one resiliently-mounted element across an opening in a hollow housing;
   circulating a circulation fluid through said housing such that it comes into direct contact with, and at least partially supports, said at least one element;
   feeding the fluid to be concentrated onto said resiliently-mounted element; and
   generating periodic vibrations in said fluid by at least partially obstructing the circulation of said circulation fluid so as to produce a water hammering effect sufficient to cause vibration of said element at a predetermined frequency so as to divide said liquid to be concentrated into fine droplets such that the evaporation surface thereof is substantially increased.

2. The process according to claim 1, wherein said housing has an inlet and an outlet, wherein at least two substantially closed circuitous flow channels are provided, both of which merge and are joined to said inlet and said outlet of said housing, and wherein said step of generating periodic vibrations comprises intermittently stopping the circulation of said circulation fluid in each of said separate flow paths, so as to cause said element to vibrate at a frequency equal to the sum of the water-hammering shock waves caused in each of said flow channels.

3. The process according to claim 2, additionally including the step of effecting circulation of said circulation fluid through said flow channels by means of a centrifugal pump.

4. The process according to claim 1, additionally including the step of preheating said circulation fluid prior to said circulation thereof through said housing.

5. The process according to claim 4, wherein said element comprises a generally planar element, wherein said circulation of the fluid through said housing is controlled by at least one closeable valve, and wherein said generating step comprises closing said valve periodically.

6. The process according to claim 1, wherein said fluid is a circulation liquid.

7. The process according to claim 6, wherein said element comprises a generally planar element, wherein said circulation fluid is fed to and discharged from said housing via a circuitous flow channel and wherein a second housing is incorporated in said flow channel having an inlet pipe and an outlet pipe, a motor-driven shaft mounted in said housing and at least one arm secured to said shaft having an obturator mounted thereon and wherein said generating step comprises rotating said shaft and, in turn, said obturator for periodically stopping the flow of said circulation liquid through said inlet and outlet pipes.

8. The process according to claim 6, wherein said element comprises a generally planar element, wherein said circulation fluid is fed to and discharged from said housing via a ciruitous flow channel and wherein a second housing is incorporated in said flow channel having an inlet pipe and an outlet pipe and an upper hollow cylindrical chamber disposed between and communicating with said inlet and outlet pipes, a piston mounted in said cylindrical chamber for reciprocal movement, a drive shaft mounted in said housing and rod means for connecting said shaft to said piston to effect reciprocal movement of said piston and wherein said generating step comprising reciprocally moving said piston and thereby periodically shutting off the flow of circulation fluid through said inlet and outlet pipes.

9. The process according to claim 1, wherein said step of at least partially obstructing comprises periodically stopping circulation of said circulation fluid.

10. The process according to claim 1, wherein said fluid to be concentrated comprises a fruit juice.

11. The process according to claim 1, wherein said fluid to be concentrated comprises sea water.

12. The process according to claim 1, wherein said generating step produces a gaseous distillate and a condensate and wherein said process additionally includes the step of separately recovering said gaseous distillate and said condensate;

13. The process according to claim 1, wherein said process steps are performed under sub-atmospheric pressure.

* * * * *